United States Patent [19]

Nerstad et al.

[11] 4,238,020
[45] Dec. 9, 1980

[54] CENTRIFUGAL CLUTCH WITH AN OVERSPEED RELIEF VALVE AND CLUTCH MODULATION

[75] Inventors: Karl A. Nerstad, Peoria; Curtis E. Chadwick, III, Edelstein; Gordon W. Johnson, Dunlap, all of Ill.

[73] Assignee: Caterpillar Tractor Co., Peoria, Ill.

[21] Appl. No.: 858,864

[22] Filed: Dec. 8, 1977

[51] Int. Cl.³ .............. F16D 43/284; F16D 25/063; F16K 17/04
[52] U.S. Cl. ............ 192/103 FA; 192/85 A; 192/85 F; 192/104 F; 192/105 F; 192/106 F; 192/109 F; 137/56; 137/542; 251/282
[58] Field of Search .......... 192/104 F, 106 F, 105 A, 192/85 F, 85 A, 105 F, 103 F, 109 F, 103 FA; 137/535, 542, 56, 333; 251/282

[56] References Cited

U.S. PATENT DOCUMENTS

| 392,054 | 10/1888 | Morgan | 137/542 |
|---|---|---|---|
| 1,935,318 | 11/1933 | Hawxhurst | 137/56 |
| 2,163,203 | 5/1937 | Kegresse | 192/103 FA |
| 2,562,515 | 7/1951 | Wemp | 192/105 A |
| 2,864,479 | 12/1958 | Schindler | 192/103 FA |
| 2,964,959 | 12/1960 | Beck et al. | 192/103 FA |
| 3,094,203 | 6/1963 | Jania et al. | 192/106 F |
| 3,176,813 | 4/1965 | Lee et al. | 192/103 F |
| 3,324,983 | 6/1967 | Snoy et al. | 192/104 F |
| 3,424,029 | 1/1969 | Horsch et al. | 192/103 FA |
| 3,542,174 | 11/1970 | Hattori | 192/103 FA |
| 3,647,037 | 3/1972 | Toma | 192/104 F |
| 3,684,238 | 8/1972 | Michellone et al. | 251/282 |
| 3,740,174 | 6/1973 | Amtsberg | 251/282 |
| 3,750,789 | 8/1973 | Buchelt | 192/105 A |
| 3,819,020 | 6/1974 | Smith | 192/85 F |
| 3,872,956 | 3/1975 | Herr et al. | 192/104 F |
| 3,926,288 | 12/1975 | Nerstad | 192/105 A |
| 3,974,844 | 8/1976 | Pimentel | 251/282 |
| 4,006,808 | 2/1977 | Starling et al. | 192/105 A |
| 4,084,609 | 4/1978 | Johnson | 137/542 |

FOREIGN PATENT DOCUMENTS

144053  2/1954 Sweden .................................. 251/282

*Primary Examiner*—Allan D. Herrmann
*Attorney, Agent, or Firm*—Phillips, Moore, Weissenberger, Lempio & Majestic

[57] ABSTRACT

A fluid pressure operated clutch which transmits torque from an engine output shaft to a transmission input shaft, including a rotatable flywheel connected to the output shaft, an adapter connected to the flywheel for rotation with the flywheel, the adapter having a first annular plate with a fluid passage near the inner periphery of the plate, and a centrifugal piston which defines with the adapter a fluid chamber supporting a rotatable torus of hydraulic fluid. The piston has a second annular plate, slideable with respect to the first plate, and a second fluid passage near the outer periphery of the second plate. The first and second plates, at their inner peripheries, provide a controlled clearance to vary the rate of hydraulic fluid into the first fluid chamber as the second plate slides. A centrifugal relief valve is connected to the piston and has a conical valve member removably seated on an outlet of the valve to drain fluid from the chamber through the second passage and the outlet when engine overspeed occurs. A clutch pack of friction plates responds to movement of the piston to engage and disengage the clutch.

10 Claims, 3 Drawing Figures

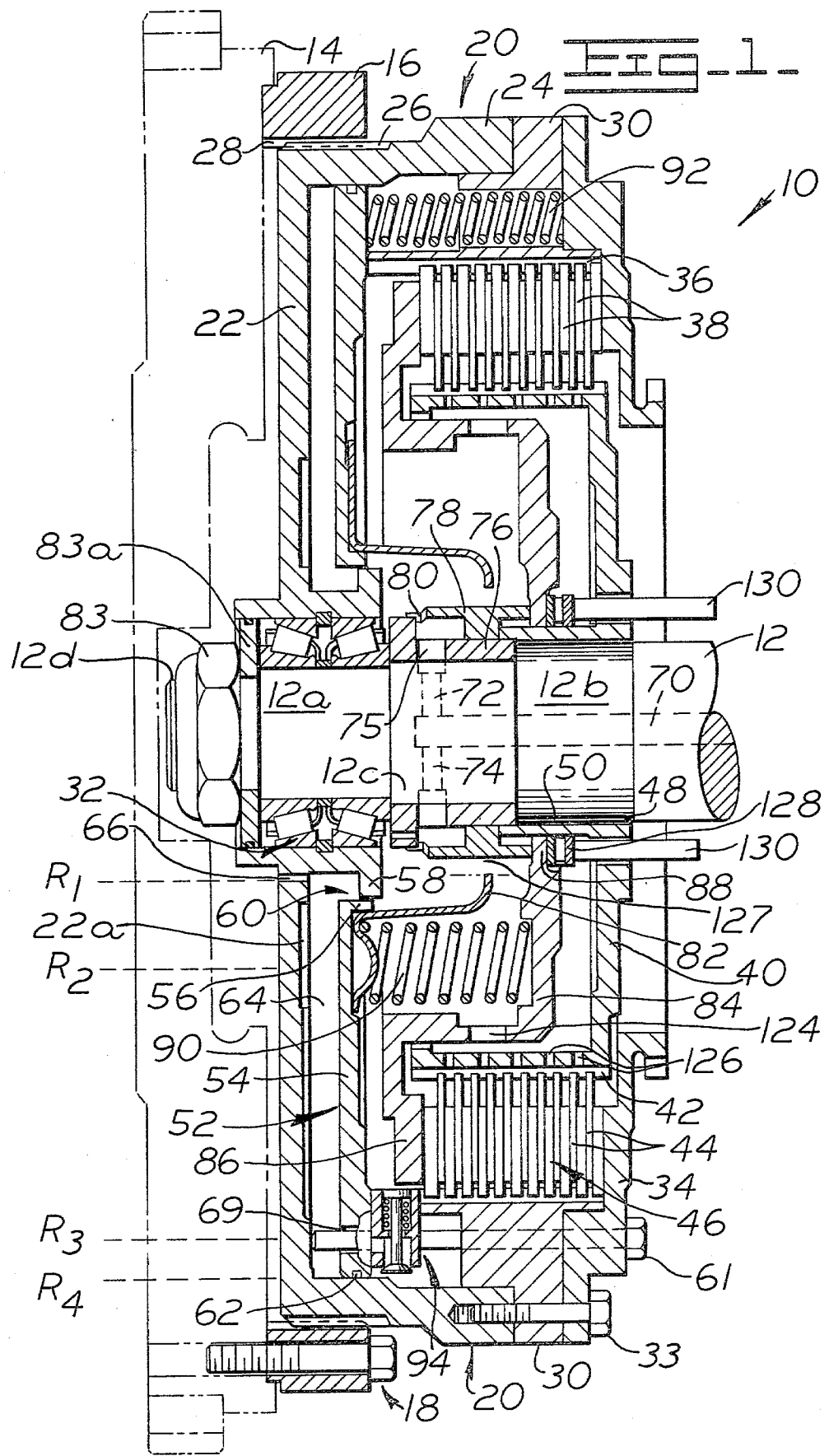

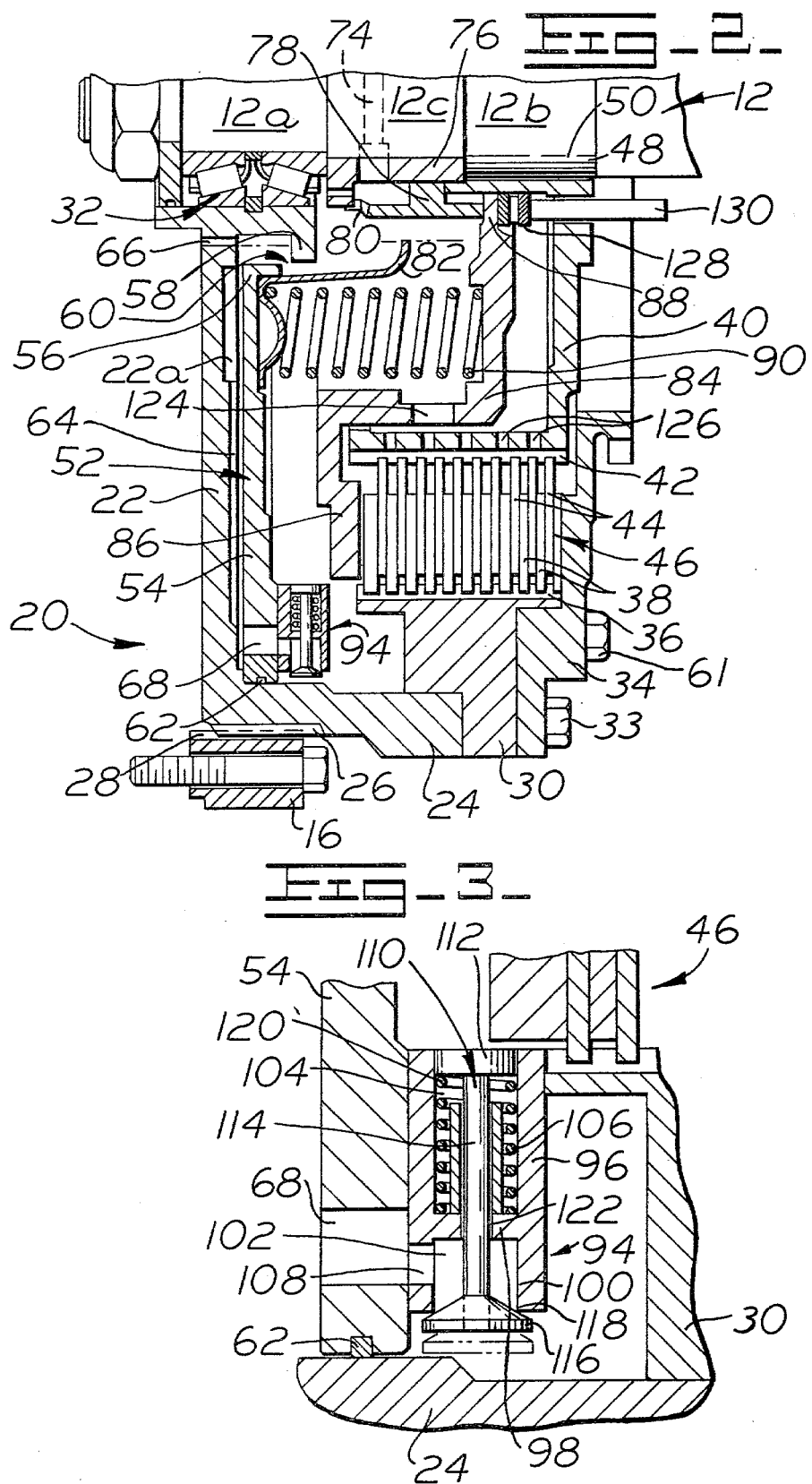

CENTRIFUGAL CLUTCH WITH AN OVERSPEED RELIEF VALVE AND CLUTCH MODULATION

BACKGROUND OF THE INVENTION

This invention relates to a centrifugal clutch having an engine overspeed relief valve and, more particularly, to a clutch and relief valve which permit relatively quick disengagement of the clutch when engine overspeed occurs and modulation of the clutch pressure during clutch engagement, and which prevents engine stall.

In vehicles, hydraulically operated clutches are frequently used in which pairs of clutch plates constituting a clutch pack are frictionally engaged through the use of fluid pressure to apply torque from an engine output shaft to a transmission input shaft. One type of friction clutches is known as a centrifugal clutch in which a hydraulic fluid chamber is provided by two, spaced-apart annular members which rotate with a circular flywheel coupled to the engine. One of the annular members constitutes a piston which is slidable with respect to the other annular member to apply pressure on the clutch pack to engage the clutch or to disengage the clutch when the pressure is released. Hydraulic fluid is introduced to the fluid chamber and, as the two members rotate, a rotating torus of fluid formed by centrifugal force creates an axial force acting against the piston to slide the piston for clutch engagement and disengagement purposes.

The centrifugal clutch also has an overspeed relief valve which is carried by, for example, the piston. The relief valve is also responsive to centrifugal force to protect the engine from damage due to engine overspeed. When overspeed occurs, the relief valve opens to discharge the hydraulic fluid in the fluid chamber, thereby releasing the frictional contact of the clutch pack plates and disengaging the clutch. When the engine is below overspeed, the relief valve closes to allow the fluid chamber to fill with fluid whereby the piston slides to engage the clutch through frictional contact of the pack plates.

While the prior centrifugal clutch having the relief valve performs satisfactorily, it does not necessarily provide as quick a response to engine overspeed as would be desirable for purposes of preventing engine damage. This is due in part to the time required for the relief valve to open when engine overspeed occurs and the time required to drain the fluid chamber once the relief valve is opened. Also, in such a prior centrifugal clutch, the flow rate of hydraulic fluid into the fluid chamber during clutch engagement is substantially constant. Since the flow rate at which the chamber is filled also determines the rate at which torque is applied from the engine output shaft to the transmission input shaft, there is substantially no control over the modulation of clutch pressure during engagement of the clutch.

SUMMARY OF THE INVENTION

The present invention is directed to overcoming one or more of the problems as set forth above.

In accordance with the present invention, there is provided a relief valve, for mounting on a centrifugal clutch having a first fluid chamber, to prevent damage to an engine due to engine overspeed, the clutch being engaged and disengaged in response to centrifugal force acting on fluid in the first chamber. The valve includes a body means having a second fluid chamber, an inlet means for continually communicating the first chamber with the second chamber, and an outlet means for the second chamber, together with a means, responsive to the centrifugal force, for controlling the opening of the outlet means to relieve fluid from the first chamber through the second chamber when the engine reaches overspeed.

BRIEF DESCRIPTION OF THE DRAWINGS

FIG. 1 is a cross-sectional view of the centrifugal clutch and relief valve of the invention showing the clutch engaged.

FIG. 2 is a fragmentary sectional view of the lower half of the clutch of FIG. 1 showing the clutch engaged.

FIG. 3 is an enlarged sectional view of the relief valve shown in FIGS. 1 and 2.

DETAILED DESCRIPTION OF THE PREFERRED EMBODIMENT

With reference to FIGS. 1 and 2, there is shown a centrifugal clutch 10 which transmits torque from a crankshaft (not shown) of an engine (not shown) to an input shaft 12 of a vehicle transmission (not shown). The clutch 10 includes a circular flywheel 14 which can be connected to the crankshaft of the engine in a conventional manner to rotate when the engine is in operation. A ring 16 is connected to the flywheel 14 by a plurality of bolts 18 spaced around the ring 16 and extending through the ring 16 and flywheel 14, whereby the ring 16 rotates with the flywheel 14.

A flywheel adapter 20 includes an annular plate 22 having a flange 24 extending rearwardly from the outer periphery of plate 22. Flange 24 has a spline 26 which engages a spline 28 at the inner periphery of ring 16 to enable the adapter 20 to rotate with the flywheel 14 through ring 16. Adapter 20, at the inner periphery of plate 22, is rotatably supported on a thrust bearing shown generally at 32, which in turn is supported on a stepped portion 12a of the transmission input shaft 12.

An outer annular hub 30 is fixed on one side to the adapter 20 with a plurality of bolts 33 which extend through an annular retaining or pressure plate 34 on the other side of the hub 30, through the hub 30 and into the flange 24. Hub 30, which can therefore rotate with adapter 20, has a plurality of splines 36, spaced about the inner periphery of the hub, which support a plurality of annular driving friction plates 38 that rotate with the hub 30 and are movable axially along the splines 36.

An inner rotatable annular hub 40 has a plurality of splines 42, spaced about the outer periphery of hub 40, which support a plurality of annular driven friction plates 44 that are movable axially along the splines 42, but can rotate with the hub 40. The driving plates 38 and driven plates 44 constitute a clutch pack, as shown generally at 46, in which upon frictional engagement of the plates 38 with plates 44, the inner hub 40 is caused to rotate with flywheel 14 through ring 16, adapter 20 and hub 30. The hub 40 also has a plurality of splines 48, spaced about the inner periphery of hub 40, which engage splines 50 on the outer periphery of a stepped portion 12b of transmission input shaft 12 to rotate the latter when the plates 38 and 44 are in frictional engagement, i.e., when the clutch 10 is engaged.

An annular piston 52 includes a plate 54 having an inner, rearwardly extending flange 56 that cooperates with an inner flange 58 of plate 22 to provide a controlled clearance 60 therebetween for reasons which will be described. A plurality of bolts 61 extend through pressure plate 34, hub 30 and plate 54 to allow the piston 52 to rotate with adapter 20, yet slide axially with respect to adapter 20. A ring 62 at the outer periphery of plate 54 seals the piston 52. Piston 52 is slidable axially to provide various forces on clutch pack 46 to engage and disengage clutch 10.

A fluid chamber 64, which continually receives hydraulic fluid such as oil when the engine is operating, is defined by plate 22 of adapter 20 and plate 54 of piston 52. Since piston 52 is slidable in relation to adapter 20, chamber 64 is a variable volume or capacity chamber. Plate 22 also has a fluid passage or outlet opening 66 near its inner periphery to drain fluid from chamber 64 when the speed of the engine and hence the rotational speed of adapter 20 is low. Opening 66 also vents air trapped in the inner periphery of chamber 64 when commencing filling of the chamber, which air would otherwise block entrance of the hydraulic fluid. Plate 54, as shown in FIGS. 2 and 3, has near its outer periphery a fluid passage or outlet opening 68 through which fluid in chamber 64 is relieved when the engine reaches overspeed. As shown in FIG. 1, plate 54 also has openings 69 that provide a close clearance with bolts 61 so that hydraulic fluid in chamber 64 is not excessively lost.

To introduce hydraulic fluid into the chamber 64, the transmission input shaft 12 has an internal fluid passage 70 which branches into passages 72 and 74 that extend through a stepped portion 12c. The fluid is then fed through an annular opening 75 of a sleeve 76 about the stepped portion 12c. Another sleeve 78 extends about the sleeve 76 to define an annular opening 80 between the sleeves 76 and 78. An annular cup 82 is connected to the plate 54 of piston 52 to retain and direct hydraulic fluid received through opening 80 to chamber 64 through the clearance 60. A nut 83 and annular retaining plate 83a about a stepped portion 12d of shaft 12 retain the various elements including bearing 32 and sleeve 76 on shaft 12.

With the engine in operation, whereby adapter 20 and piston 52 will be in rotation, as hydraulic fluid enters the chamber 64, an annular torus of fluid will be produced in the chamber 64 due to centrifugal force. The centrifugal force acting on the torus of fluid in chamber 64 will cause the torus to create an axial force acting against the piston 52 to move the piston 52 between its FIG. 2 position in which the clutch 10 is disengaged and its FIG. 1 position, in which the clutch 10 is engaged. The magnitude of this axial force depends on the magnitude of the centrifugal force which, in turn, depends on the speed of the engine. As the chamber 64 is drained of hydraulic fluid, either through the passage 66 or passage 68, the piston 52 will be caused to move to the left towards the FIG. 2 position to disengage the clutch 10.

An annular pressure plate 84 has one outer peripheral end 86 adjacent the clutch pack 46 and another inner peripheral end 88 that is slidable along hub 40 towards and away from the sleeve 78. Pressure plate 84 is slidable axially a small distance to provide pressure on the clutch pack 46 in the position shown in FIG. 1 and to provide no pressure on the pack 46 in the position shown in FIG. 2. A plurality of compression springs 90 are connected between and about the plate 84 and cup 82 to urge apart the plate 84 and piston 52. Thus, as the piston 52 moves, for example, to the right from the position shown in FIG. 2, plate 84 will move to the right to apply pressure on the clutch pack 46 through reaction by pressure plate 34 so that plates 38 and 44 can be frictionally engaged.

Another plurality of springs 92 are connected between and about the retaining or pressure plate 34 and the plate 54 of piston 52. Springs 92 function as clutch disengagement springs to disengage the clutch 10 at low engine speed. The springs 92 provide a force acting on piston 52 which overcomes fluid pressure in chamber 64 at the low engine speed.

With reference to FIG. 3, there is shown an overspeed relief valve 94 that responds to centrifugal force to discharge hydraulic fluid in chamber 64 when engine overspeed occurs to prevent damage to the engine. The valve 94 includes a cylindrical body 96 that is connected to piston 52 near the outer periphery of plate 54 to move with the piston 52. The body 96 has an inner circular ring 98 dividing an inner bore or chamber 100 into two fluid receiving compartments 102 and 104. An annular sleeve 106 extends within compartment 104 from the ring 98. The body 96 also provides an inlet opening 108 that is aligned with opening 68 to continually communicate chamber 64 with chamber 100.

A piston assembly 110, slidable within body 96, has a head member 112 slidable within compartment 104, an elongated rod 114 extending from head member 112 through compartments 104 and 102, and a conically shaped valve member 116 which is removably seated on the outside of body 96 at an outlet 118 for the compartment 102. A spring 120 is connected between the ring 98 and head member 112 to bias the valve member 116 into a seating position as shown in full lines to normally close the valve 94. As shown in FIG. 3, outlet 118 forms a knife edge making line contact with the valve member 116.

An annular passage 122 is provided between ring 98 and rod 114 to admit hydraulic fluid into compartment 104 through openings 68, 108 and compartment 102. When a rotating torus of hydraulic fluid is in chamber 64, a portion of that fluid will flow through opening 68 into both compartments 102 and 104. The fluid in compartment 102 will provide a pressure $p_{102}$ acting on the valve member 116 while the fluid in compartment 104 will provide a pressure $p_{104}$ acting on the head member 112. The pressure $p_{104}$ is always less than the pressure $p_{102}$ since the former occurs at a smaller radius than the latter. The relief valve 94 can be fluid pressure balanced by making the area $A_{112}$ of head member 112 greater than the area $A_{116}$ of valve member 116 so that $p_{104}A_{112} = p_{102}A_{116}$. The relief valve 94 can be made fluid pressure assisted closing by making $p_{104}A_{112}$ greater than $p_{102}A_{116}$. As another alternative, the relief valve 94 can be made fluid pressure assisted opening by making $p_{104}A_{112}$ less than $p_{102}A_{116}$.

The operation of the centrifugal clutch 10 having the relief valve 94 will now be described. In discussing this operation, reference will be made to radii $R_1$, $R_2$, $R_3$ and $R_4$, shown in FIG. 1, which represent various radii of the torus of hydraulic fluid in the chamber 64 at different times during engagement and disengagement of the clutch 10.

First, there will be described the manner in which the clutch 10 moves from the fully disengaged position shown in FIG. 2 to the fully engaged position shown in FIG. 1. When the engine is turned on, the flywheel 14 will commence rotating and hydraulic fluid will be continuously pumped through passages 70, 72 and 74 into cup retainer 82. From retainer 82, the hydraulic fluid will flow through the relatively wide clearance 60 shown in FIG. 2 into the relatively small fluid chamber 64. Since the adapter 20 and piston 52 are in rotation with flywheel 14, the hydraulic fluid entering chamber 64 will also be in rotation. Consequently, a torus of fluid will begin to develop due to centrifugal force, with the outside radius of the fluid being at $R_4$.

As the engine speed increases, and as the hydraulic fluid is continuously delivered into chamber 64, the torus of fluid will continue to develop with its outer radius being at $R_4$ and its inner radius moving towards $R_1$. During this increase in engine speed, the hydraulic fluid in chamber 64 produces axial forces on piston 52 to move this piston 52 to the right from its FIG. 2 position towards its FIG. 1 position The axial force on piston 52 at very low engine speeds is not sufficient to overcome the force provided by the disengagement springs 92; therefore, the piston 52 will not slide axially. However, as the engine speed increases from these very low speeds, the axial force provided by the hydraulic fluid in chamber 64 starts to overcome the force of spring 92 to move the piston 52 to the right towards the clutch engaged position. As piston 52 slides to the right, springs 90 will also slide pressure plate 84 to the right to commence frictional contact of the plates 38 and 44 in clutch pack 46. At, for example, an engine speed of 1,000 rpm and above, the torus of hydraulic fluid in chamber 64 will have an outer radius $R_4$ and an inner radius $R_1$, which will provide a sufficient axial force to maintain the plates 38 and 44 in full frictional contact and hence the clutch 10 fully engaged. In this clutch engaged position, since the hydraulic fluid is continuously supplied to chamber 64, excess fluid inside of radius $R_1$ will drain through the passage 66 and additional excess fluid will flow out of the cup retainer 82 for lubrication purposes as will be later described.

As the torus of hydraulic fluid is being developed in chamber 64, some of this fluid will flow through passage 68 into the compartments 102 and 104 of relief valve 94. As already described, the relief valve 94 can be designed to balance the pressure forces acting on piston assembly 110, or make the relief valve 94 pressure assisted closing, or make the relief valve pressure assisted opening.

With the clutch 10 engaged, as long as the engine has not reached overspeed which, for example, may be 10,000 rpm, the centrifugal force acting on the piston assembly 110 in relief valve 94 will not be sufficient to overcome the forces provided by the fluid in compartments 102 and 104 and by the spring 120. That is, the valve member 116 will remain seated on the outlet 118 as shown in full lines in FIG. 3 to prevent the fluid in chamber 64 from draining through the valve 94. Thus, piston 52 will remain in the position shown in FIG. 1 whereby the clutch 10 is fully engaged.

At engine overspeed, the centrifugal force acting on relief valve 94 will be sufficient to overcome the fluid pressure forces in compartments 102 and 104 and the spring force provided by spring 120. Consequently, piston assembly 110 will slide within body 96 so that the valve member 116 will be removed from its seat on outlet 118 to the position shown in phantom in FIG. 3. Thus, hydraulic fluid in chamber 64 will start to drain through passge 68, compartment 102 and outlet 118 around the valve member 116.

The moment engine overspeed occurs, the relief valve 94 responds very quickly to drain the fluid from chamber 64. This is as a result of the conical shape of the valve member 116. This cone shape provides a relatively large flow area through outlet 118 with only a relatively small movement of the valve member 116. Consequently, since the head member 112 only has to move a small distance to adequately unseat valve member 116, and since valve member 116 is not in frictional contact with body 96 at outlet 118, there will not be much sliding frictional forces that will have to be overcome by the centrifugal force acting on the valve 94.

Moreover, not only is the response time of the valve 94 relatively quick, but the chamber 64 can be very quickly drained of hydraulic fluid once the valve 94 is opened. This is because in the clutch engaged position shown in FIG. 1, the controlled clearance 60 through which fluid enters the chamber 64 is relatively small at this time. Consequently, the flow rate of fluid into the chamber 64 is relatively small compared to the flow rate of fluid drained from the chamber 64 through valve 94. As the fluid in chamber 64 is drained through valve 94, there will be less axial forces acting on the piston 52 so that the piston 52 will quickly move to the left carrying pressure plate 84 with it, thereby quickly disengaging the clutch 10.

With the engine continuing in an overspeed condition and the clutch disengaged, the torus of hydraulic fluid will have an outside radius $R_4$ and an inside radius at about $R_3$. When the engine speed is reduced to a safe level, i.e., below overspeed, the centrifugal force acting on valve 94 will be reduced so that outlet 118 again will be closed by valve member 116. This closing of the valve 94 will allow the chamber 64 to again be filled with hydraulic fluid. Since in the disengaged position of piston 52 the controlled clearance 60 is relatively large, as shown in FIG. 2, the chamber 64 can be refilled rapidly to quickly engage the clutch 10. Thereafter, the overspeed valve 94 will cycle again as already described to disengage the clutch 10 should overspeed again occur.

In addition to enabling the clutch 10 to be quickly disengaged when engine overspeed occurs, the controlled clearance 60 also provides for control of the pressure on plates 38 and 44 during clutch engagement to allow for slippage between the plates. As already noted, when the engine is at very low speeds, the disengagement springs 92 will hold the piston 52 in the disengaged position shown in FIG. 2, with the torus of fluid having an inner radius of about $R_1$. As the engine speed increases from the very low speeds, the axial force on the piston 52 due to the torus of hydraulic fluid in chamber 64 increases until it overcomes the force of springs 92 and begins to move suddenly. At this time of sudden movement, the inner radius of the torus of hydraulic fluid moves out to $R_2$. With the torus of hydraulic fluid at $R_2$, piston 52 will have moved to the right to commence clutch engagement, and the clearance 60 will have decreased, somewhat, thereby slightly decreasing the flow rate of fluid into the chamber 64.

As the hydraulic fluid fills the chamber 64 after this sudden movement, the inner diameter of the torus will move from $R_2$ to $R_1$ so that the axial force produced by the torus on piston 52 will increase causing piston 52 to move further to the right and clearance 60 to get smaller and smaller. This rightward movement of piston 52 in turn increases the clutch torque capacity. The rate at which the chamber 64 is thus filled, which rate is determined by the clearance 60, gives the rate at which pressure is applied to the clutch pack 46 and hence the rate at which torque is applied to the shaft 12. Consequently, clutch engagement is modulated by controlling the flow rate into the chamber 64 with controlled clearance 60. It may be seen from FIGS. 1 and 2 that plate 22 can be provided with a cavity 22a to add to the volume of fluid in chamber 64, and thereby, affect $R_2$, i.e., the radius at which the piston 52 moves suddenly.

The clutch 10, in addition to those functions already described, also prevents the engine from stalling. Engine stall can occur when the engine is at high speed (not overspeed) and then is suddenly decelerated such as by applying the brakes of a vehicle. At such high speed, with the clutch 10 engaged with the piston 52 in position as shown in FIG. 1, the relatively small control clearance 60 prevents the fluid in chamber 64 from leaving the chamber quickly this clearance. However, the passage 66 of adapter 20, which is inside of the inner radius $R_1$ of the torus at this time of sudden deceleration, allows the fluid in the chamber 64 to drain relatively quickly through this passage. Consequently, the axial force on piston 52 will decrease so that this piston will move to the left together with pressure plate 84 to disengage rapidly the clutch 10.

As also shown in FIGS. 1 and 2, pressure plate 84 has an opening 124, while hub 40 has a plurality of openings 126. Excess hydraulic fluid in cup retainer 82 will flow through a passage 127 between the retainer 82 and sleeve 78, and through openings 124 and 126, to lubricate the clutch pack 46.

While not part of the invention, FIGS. 1 and 2 also illustrate an annular friction disc 128 which can rotate shaft 12, and a plurality of pins 130 which extend through the hub 40 and bear against the disc 128. This disc 128 and pins 130 are similar to those described in U.S. Pat. No. 3,926,288, assigned to the assignee of this invention. As described in such patent, pins 130 are slidable to the left as viewed in FIG. 1 to force friction disc 128 to slide to the left. This would result in the pressure plate 84 also sliding to the left to relieve the pressure on the clutch pack 46 and to remove frictional contact between the plates 38, 44. The set of pins 130 are moved to the left by the means shown in such patent in order that the transmission may be shifted. At the completion of the shift, the above action of disc 128 and pins 130 is reversed to again apply pressure on the pack 46. The friction disc 128 also functions to impart some initial acceleration to the transmission input shaft 12 in advance of frictional contact of the plates 38, 44 to assure that all gears in the transmission mesh before a full torque is applied by the pack 46. This initial acceleration is provided by having the arm 88 first contact disc 128 before the arm 86 applies full pressure on the pack 46.

While the invention has been particularly shown and described with reference to a preferred embodiment thereof, it will be understood by those skilled in the art that the foregoing and other changes in form and details may be made therein without departing from the spirit and scope of the invention.

The embodiments of the invention in which an exclusive privilege or property is claimed are defined as follows:

1. Apparatus for quickly disengaging a clutch pack of a clutch to prevent damage to an engine due to engine overspeed, comprising:
   (a) means for exerting forces on the clutch pack to engage and disengage the clutch, including piston means for moving towards a clutch engaging position in response to fluid pressure produced by centrifugal force, and means for defining with said piston means a fluid chamber;
   (b) means for varying the rate at which said chamber is filled with fluid, including means for providing a controlled clearance between said piston means and said defining means which is reduced as said piston means moves towards said clutch engaging position, said clearance being a fluid pathway into said chamber; and
   (c) centrifugal relief valve means for discharging fluid in said chamber in response to engine overspeed to disengage the clutch.

2. A fluid pressure operated clutch for transmitting torque from an output shaft on an engine to a transmission input shaft, comprising:
   (a) a rotatable flywheel means for connection to the engine output shaft;
   (b) an adapter means connected to said flywheel means for rotation with said flywheel means, including a first annular plate having a first fluid passage near the inner periphery of said first plate;
   (c) a centrifugal piston means for defining with said adapter means a first fluid chamber, including a second annular plate slidable with respect to and rotatable with said first annular plate and having a second fluid passage near the outer periphery of said second plate, said first plate and said second plate, at their inner peripheries, providing means for varying the flow rate of fluid into said first fluid chamber as said second plate slides;
   (d) centrifugal relief valve means for discharging fluid from said first fluid chamber through said second passage when the engine overspeeds, including a body means connected to said second plate and having a second fluid chamber in fluid communication with said first chamber through said second passage, an outlet means for said second chamber and a conical valve means removably seated on said outlet means to open and close said outlet means; and
   (e) a clutch pack means, responsive to movement of said piston means, for coupling the engine output shaft to the transmission input shaft.

3. Apparatus for controlling the pressure on a clutch pack of a centrifugal clutch for an engine to control the engagement and disengagement of the clutch, comprising:
   (a) means for exerting forces on the clutch pack to engage and disengage the clutch in response to fluid pressure produced by centrifugal force, said exerting means having a first rotatable chamber being adapted to receive fluid; and
   (b) relief valve means for relieving fluid from said first chamber in response to engine overspeed, including
      (i) a body having a second chamber having a first inner compartment and a second outer compartment in fluid communication with each other, a fluid inlet being adapted to continually communicate said first chamber with said second chamber, and a fluid outlet being coupled to said second compartment, said body being coupled to said first chamber; and
      (ii) means for opening and for closing said outlet in response to centrifugal force and for assisting the opening or closing of said outlet with a predetermined force in response to fluid pressure in said first compartment and said second compartment.

4. Apparatus according to claim 32 wherein said means for opening and for closing and for assisting the opening or closing includes:
   (a) a head member being slidably coupled in said first compartment;
   (b) a valve member being removably seated on said outlet, said head member and said valve member each being constructed to provide an area to fluid pressure assist the opening or closing of said outlet or to fluid pressure balance the opening and closing of said outlet; and
   (c) means for interconnecting said head member and said valve member.

5. Apparatus according to claim 3 wherein said inlet is positioned to communicate said first chamber with said second compartment.

6. Apparatus for modulating the pressure on a clutch pack of a centrifugal clutch to control the engagement and disengagement of the clutch, comprising:
   (a) means for exerting forces on the clutch pack to engage and disengage the clutch, including piston means for moving in response to fluid pressure produced by centrifugal force and means for defining with said piston means a fluid chamber; and
   (b) means for varying the rate at which said chamber is filled with fluid, including means for providing a controlled clearance between said piston means and said defining means as said piston means moves, said clearance being a fluid pathway into said chamber.

7. Apparatus according to claim 6 wherein said defining means comprises a first rotatable annular plate, and said piston means comprises a second annular plate slidably coupled in relation to said first annular plate.

8. Apparatus according to claim 7 wherein said controlled clearance providing means comprises a pair of spacedapart members, each comprising the inner periphery of one of said first plate and said second plate.

9. Apparatus for controlling engagement and disengagement of a clutch pack of a centrifugal clutch, comprising:
   (a) piston means for exerting forces on the clutch pack to engage and disengage the pack in response to fluid pressure produced by centrifugal force, including a first annular plate; and
   (b) means for defining with said piston means a fluid chamber having first and second opposite sides, including a second annular plate, said first annular plate and said second annular plate forming a controlled clearance fluid inlet at said first side of said chamber at the inner periphery of said first annular plate and said second annular plate, and said second annular plate having a fluid outlet at said second side at the inner periphery of said second plate.

10. A centrifugal fluid relief valve, comprising:
   (a) a body having an inner bore of a first fluid compartment and a second fluid compartment in communication with said first compartment, an open fluid inlet in communication with said first compartment, and a fluid outlet having an edge and being in communication with said first compartment;
   (b) a conical valve member being removably seated on said edge, said edge being constructed to provide line contact with said valve member;
   (c) a head member being movably coupled in said second compartment, said valve member and said head member each being constructed to provide an area to fluid pressure assist the opening or closing of said outlet or to fluid pressure balance the relief valve;
   (d) a connecting rod extending through said first compartment and said second compartment and connecting said head member to said valve member; and
   (e) a sleeve being coupled in said second compartment about said rod.

* * * * *